June 7, 1938.　　　J. H. MILLIGAN　　　2,119,866
LOCK
Filed June 10, 1936　　　4 Sheets-Sheet 1

Inventor
Joseph H. Milligan
by Heard Smith & Tennant
Attys

June 7, 1938.  J. H. MILLIGAN  2,119,866
LOCK
Filed June 10, 1936   4 Sheets-Sheet 2

Inventor.
Joseph H. Milligan
by Heard Smith & Tennant.
Attys.

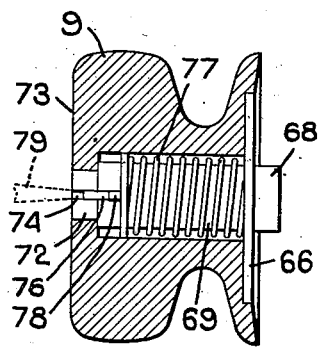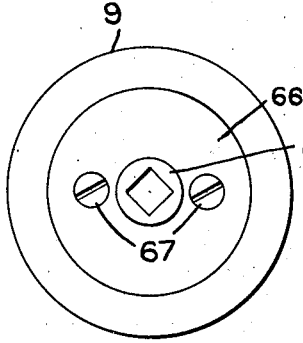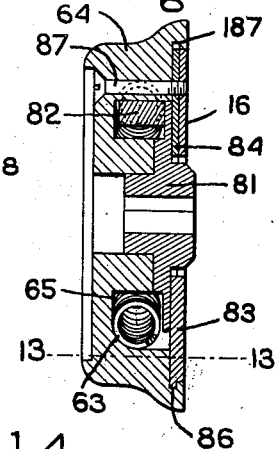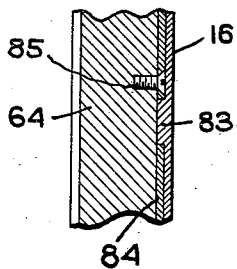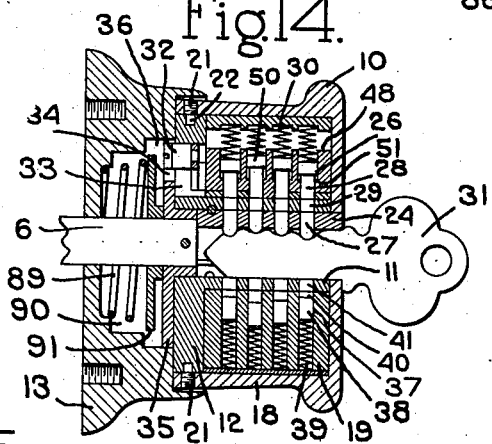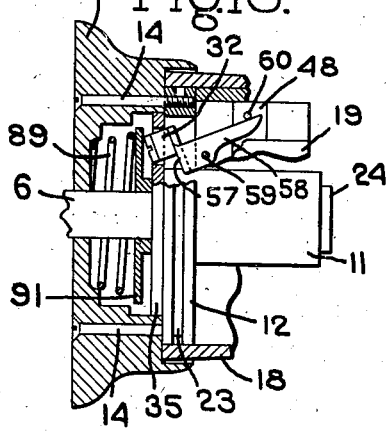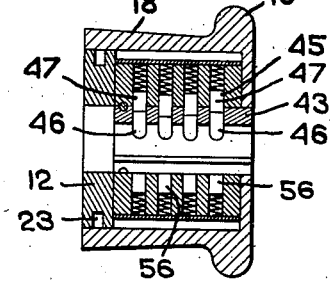

June 7, 1938.    J. H. MILLIGAN    2,119,866
LOCK
Filed June 10, 1936    4 Sheets-Sheet 4
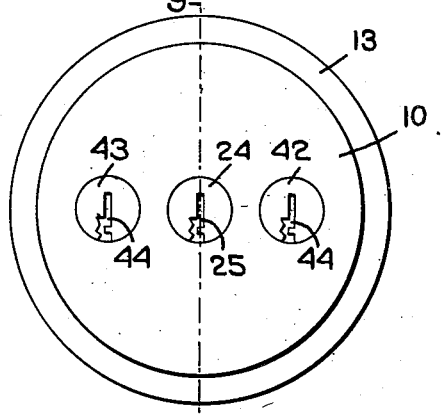
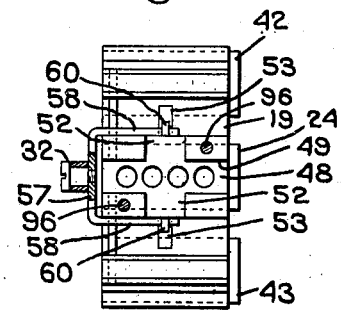
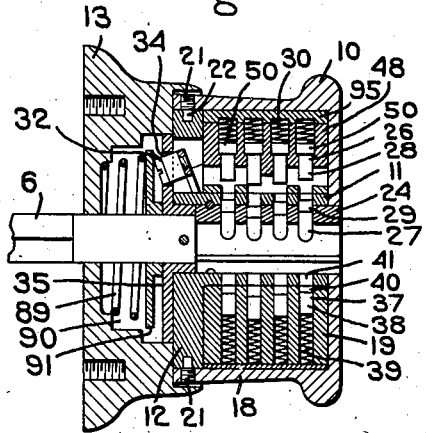
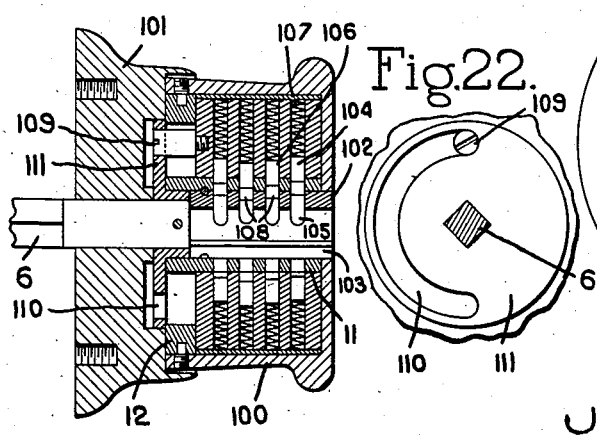
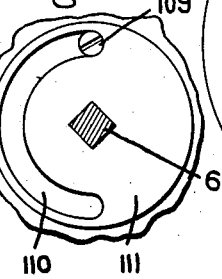
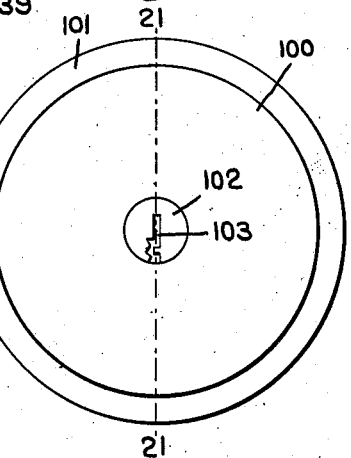
Inventor.
Joseph H. Milligan
by Heard Smith & Tennant.
Attys.

Patented June 7, 1938

2,119,866

UNITED STATES PATENT OFFICE 2,119,866

LOCK

Joseph H. Milligan, Boston, Mass.

Application June 10, 1936, Serial No. 84,446

15 Claims. (Cl. 70—340)

This invention relates to locks and particularly to locks of the tumbler pin type.

One of the objects of the invention is to provide a lock of this type which includes in its construction a plurality of separate key plugs, each operable with a different key, and through the operation of any one of which the lock may be released. This provides a lock having one key which may be used by the tenant or the person regularly occupying the room with which the lock is provided, and one or more master keys which can be used by some other person or persons who are authorized to enter the room. In the embodiment of the invention illustrated there are three such key plugs, thus providing for a regular key for unlocking the door and two differently-cut master keys.

My invention is well adapted for the type of lock in which the key plug and tumbler pins are located within the knob.

Another object of the invention is to provide a novel lock in which the knob has enclosed therein the several separate key plugs controlling the operation of the lock.

In the embodiment of the invention illustrated the lock within the knob normally locks it from being rotated, and another object of the invention is to provide a novel lock in which the mere insertion of a key in one of the key plugs will release the lock.

A further object of the invention is to provide a novel lock having the above construction in which in order to release the lock by means of either one of the master keys it is necessary to insert the master key in its key plug and then turn the plug within the knob, the turning of the plug raising up the locking pins and thus releasing the lock.

A further object of the invention is to provide a novel lock of this type having two knobs, one on each side of the door or other element to which the lock is applied, and also having a single one-piece spindle for withdrawing the bolt, and which is constructed so that the door can always be opened by turning the knob on the inside of the door notwithstanding the fact that the knob on the outside of the door is locked from rotation.

A further object of the invention is to provide a novel lock having a plurality of separate key plugs for releasing the lock, each of which key plugs is constructed so that by giving it a partial rotation and withdrawing the key the lock may be held in its released condition so that the outside knob is free to be turned for opening the door.

A still further object of the invention is to provide a novel lock of this type in which the angular position of the spindle relative to the outside knob may be changed to provide for using the spindle in the hub of a roll-back whether the flat sides in the opening of the hub have a horizontal and vertical arrangement or a 45° arrangement.

Still further objects of the invention are to improve generally locks of this type in particulars more fully hereinafter set forth.

In the drawings wherein I have illustrated some embodiments of the invention,

Fig. 10 is a section of the sectional view through the inside knob.

Fig. 11 is an end view of the inside knob.

Fig. 12 is a sectional view through the escutcheon member on the inside of the door taken on the line 12—12, Fig. 2.

Fig. 13 is a section on the line 13—13, Fig. 12.

Fig. 14 is a sectional view of the outside knob showing the tumbler pins lined up and the knob unlocked by the insertion of the key.

Fig. 15 is a fragmentary view showing the manner of attaching the knob support to the outside escutcheon member.

Fig. 16 is a section on the line 16—16, Fig. 8.

Fig. 17 is an end view of the outer knob.

Fig. 18 is a top plan view of the body portion 19 of the outer knob with the backing plate 95 removed.

Fig. 19 is a section through the outer knob on the line 9—9, Fig. 17, but showing the knob unlocked by turning the inner knob.

Fig. 20 shows a modified form of the invention wherein the outer knob has a single key plug therein.

Fig. 21 is a section on the line 21—21, Fig. 20.

Fig. 22 is a fragmentary sectional view showing the manner of coupling the outer knob to the spindle.

Figure 1:
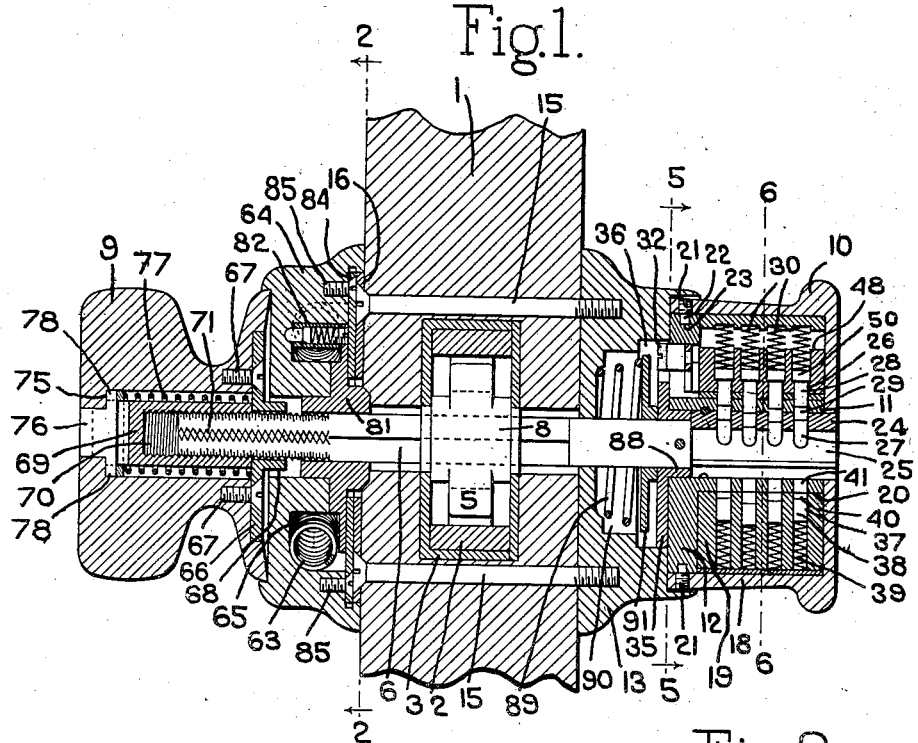
Fig. 1 shows in vertical section a lock embodying my invention as applied to a door.
Figures 2, 3:
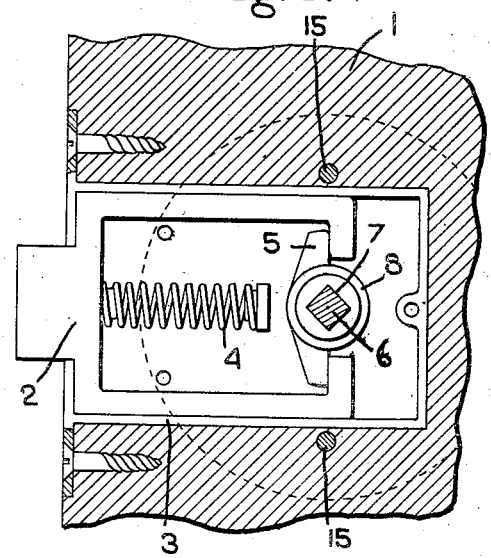
Fig. 2 is a section on the line 2—2, Fig. 1.
Fig. 3 is a fragmentary sectional view showing the usual bolt and roll-back for withdrawing the bolt.

Referring to Figs. 1 and 3 of the drawings, 1 indicates a sectional view of a door or other element to which my improved lock is applied. This door is equipped with a locking bolt 2 by which the door is locked, said locking bolt having any suitable or usual construction and being shown as enclosed in a casing 3 set into the door 1. The bolt 2 is provided with the usual spring 4 for throwing it forward and it is withdrawn through the medium of the usual roll-back 5 mounted on the spindle 6 of the door-knob structure, said spindle having the usual square cross section which fits the square opening 7 in the hub 8 of the roll-back.

The parts thus far described are of common construction and form no part of my present invention. The lock structure herein illustrated comprises an inner knob 9 secured to the inner end of the spindle 6 and situated on the inside of the door and an outer knob member 10 on the outside of the door, which outer knob member is normally locked from rotation, and suitable driving connections between the outer knob member and the spindle 6 by which the spindle may be turned to withdraw the bolt 2 when the outer knob is unlocked.

The outer knob member 10 is rotatably mounted on a stationary knob-supporting member which comprises a cylindrical portion 11 situated axially within the knob and on which the knob is adapted to turn, and a head or disk portion 12 that is fixed to an outer hub or escutcheon member 13 by means of suitable screws 14 (see Fig. 15), said escutcheon member 13 being secured to the outside of the door 1 by means of screws 15. These screws 15 extend through the door and the heads thereof are seated in a plate 16 lying against the inside of the door, said screws extending through the plate and the door and being screw-threaded into the outer hub or escutcheon member 13, as best seen in Fig. 1.

The knob-supporting member 11, 12 is, therefore, rigidly secured to the door and is a stationary element.

The outside knob member 10 comprises the shell portion 18 and the body or tumbler-pin-receiving portion 19, said shell and body being rigidly connected together. The body or tumbler-pin-receiving portion 19 is provided with a central opening 20 in which the cylindrical portion 11 of the knob-supporting member is received. The knob is retained on the knob-supporting member by means of screws 21 extending radially through the shell portion 18 near its rear end and having their tips 22 received in a groove 23 formed in the periphery of the disk portion 12 of said knob-supporting member.

The knob, when unlocked, can thus rotate on the knob-supporting member but cannot be withdrawn therefrom.

The cylindrical portion 11 of the knob-supporting member has a central bore in which is received a key plug 24 provided with a key slot 25.

The knob 10 is normally locked to the portion 11 of the stationary knob-supporting member by a tumbler pin construction which is designed not only to lock the knob to the stationary knob support but also to lock the key plug 24 thereto.

This tumbler pin construction comprises a plurality of tumbler pins 26, each divided into three sections, a setting section 27 located within the key plug 24, a follower or locking section 28 carried by the knob and when operative adapted to project into the stationary member 11, as shown in Fig. 1, thereby locking the knob from rotation, and an intermediate section 29 having the same length as the thickness of the wall of the member 11. Each pin is acted upon by the usual spring 30 which holds it in its operative or locking position.

It will be understood from the above that when there is no key in the slot 25 the springs 30 hold the tumbler pins in their depressed position so that the inner ends of the outer follower or locking sections of the pins extend into the portion 11 of the stationary knob-supporting member, and the intermediate sections 29 are located partly in the stationary member 11 and partly in the key plug 24, thereby locking both the knob 10 and the key plug.

When a proper key 31 is inserted into the key slot 25 the tumbler pins are lined up, as shown in Fig. 14, thereby unlocking both the knob 10 and the key plug 24. When the pins are thus lined up the line of division between the tumbler sections 27 and intermediate sections 29 are lined up with the periphery of the key plug and the division line between the outer or follower sections 28 and the intermediate sections 29 are in line with the outer periphery of the portion 11 of the knob-supporting member, and, as stated above, both the knob and the key plug 24 are free for turning movement.

A driving connection is provided between the knob 10 and the spindle 6 so that when the knob is unlocked a turning movement thereof will rotate the spindle and thus withdraw the bolt 2. This driving connection is shown in the form of a projection 32 extending from the rear of the body portion 19 of the knob 10 through an elongated opening or slot 33 in the disk or head portion 12 of the knob-supporting member and into an opening 34 formed in a head or disk 35 which is fast to one end of the spindle 6. This disk or head 35 is received in a recess 36 with which the escutcheon member 13 is provided.

When the knob 10 is unlocked and is then given a turning movement the projection 32 engages the wall of the opening 34, thereby turning the disk 35 and the spindle 6 with the result that the bolt 2 will be withdrawn.

It will be observed from the above that the releasing of the lock for the knob 10 is accomplished simply by inserting the key 31 in the key slot 25 and that the withdrawing of the bolt 2 is accomplished by the turning of the unlocked knob 10. The advantage of this is that in opening the door the key 31 is not subjected to any turning or twisting strain such as would be required to withdraw the bolt 2, since the force required to withdraw this bolt 2 is applied thereto through the unlocked knob 10 and not through the key.

The lock is further constructed so that by inserting the key in the key plug 24 and giving said key plug a half turn the key may be withdrawn, and the lock for the knob will then be held released so that the door is unlocked and can be opened by anyone from the outside.

Figure 9:
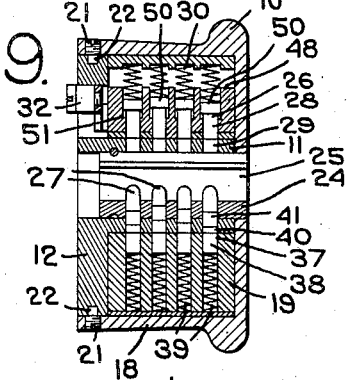
Fig. 9 is a section through the knob on the line 9—9, Fig. 17 showing the main key plug turned into a position to hold the knob unlocked.

The body portion 19 of the knob is provided with a second set of sectional pins 37 which are located opposite the pin sections 28, 29, each of said additional pins being divided into three sections, to wit, an outer section 38 which is acted on by the usual spring 39, a thin intermediate section 40 and an inner section 41 which has a length equal to the thickness of the wall of the portion 11 of the knob-supporting member. When the key plug 24 is in the position shown in Fig. 1 the pin sections 41 occupy openings in the wall 11 of the knob-supporting member, and as said sections 41 have a length equal to the thickness of this wall the sections 37 and 40 of each pin will be located entirely within the body 19. These pins are thus normally lined up to permit the knob 10 to be rotated when the tumbler pins 29 are lined up by the insertion of the key 31. When the key 31 is inserted into the key slot 25 and the plug 24 is given a half rotation into the position shown in Fig. 9, the setting sections 27 of the tumbler pins are in alignment with the tumbler pins 37, thus permitting the key to be withdrawn from the key slot 25. As soon as the key is withdrawn the springs 39 force the pins inwardly, thereby carrying the pin sections 41 partially into the plug 24 and locking the plug from rotation. When the pins 37 are in their inward position the line of division between the sections 38 and 40 of each pin is at the periphery of the wall 11 of the stationary knob-supporting member so that so far as the pins 37 are concerned the knob is free to be turned. As soon as the plug 24 is turned from the position shown in Figs. 1 and 14, the pin sections 29 will be held in their retracted position within the wall 11 by engagement with the periphery of the key plug 24, and thus after the key plug has been turned into the position shown in Fig. 9 and the key has been withdrawn the knob 10 will be released and will be free to be turned for opening the door. The key plug 24 thus has two key-receiving positions. One of these positions is that shown in Fig. 14 in which position the key 31 may be inserted to line up the tumbler pins and thereby to unlock the knob 10. The other key-receiving position is that shown in Fig. 9 in which the setting sections 27 of the tumbler pins are in alignment with the pins 37. The key 37 may be inserted into the key plug or withdrawn therefrom when the key plug is in either one of these two key-receiving positions.

I have stated above that the lock embodies a plurality of separate key plugs, each operable with its own key and through the operation of any one of which the knob 10 may be unlocked. In the embodiment of the invention herein shown there are three such key plugs, one of which is the key plug 24 that has been described above, and all of which are mounted within the knob 10. While I have shown two additional key plugs, however, I would state that the number of such additional key plugs may be varied without departing from the invention.

The two additional key plugs are indicated at 42 and 43, each of these plugs being mounted for rotation within the body portion 19 of the knob and the end of each key plug projecting through an opening in the end wall of the knob casing 18 and being flush therewith. These key plugs 42, 43 thus assist in securing the body portion 19 and casing 18 together to rotate as a unit. Each key plug 42, 43 is provided with the usual key slot 44 and the usual tumbler pins 45, each of which comprises the setting section 46 within the key plug and the spring-pressed follower or locking section 47 located in the body 19.

When the key is withdrawn the key plug (42 or 43) will be locked from rotation, as shown in Fig. 17, and the insertion of a suitable key in the key slot will line up the tumbler pins and thus unlock the plug so that it can be turned.

Means are provided whereby the turning of either key plug 42 or 43 operates to withdraw the locking pin sections 28 from the apertures in the wall 11 of the stationary knob-supporting member, thereby releasing the knob so that it can be turned. The knob, therefore, can be unlocked either by inserting the key 31 in the slot of the central key plug 24 or by inserting the proper key in the slot of either key plug 42, 43 and then turning the plug within the knob. This provides for opening the door through the medium of the ordinary or change key 31 which would be in the possession of the tenant or occupant of the room, and also through either one of two master keys which will be differently cut so that each master key will unlock one only of the key plugs 42, 43.

For withdrawing the pin sections 28 to release the knob 10 when either key plug 42 or 43 is turned there is provided a pin-lifting member 48 which is movable radially in a slot or opening 49 formed in the body 19 and which is provided with apertures into which the outer ends of the pin sections 28 extend. These pin sections are formed with heads or enlarged portions 50 at their outer ends so that when the pin-lifting member 48 is moved outwardly, as shown in Figs. 8 and 19, the shoulders 51 of the pin-lifting member engage the heads 50 and thereby withdraw the sections 28 from the wall 11, thus unlocking the knob 10 from the wall 11 of the stationary knob support, as seen in Fig. 19.

Figure 6:
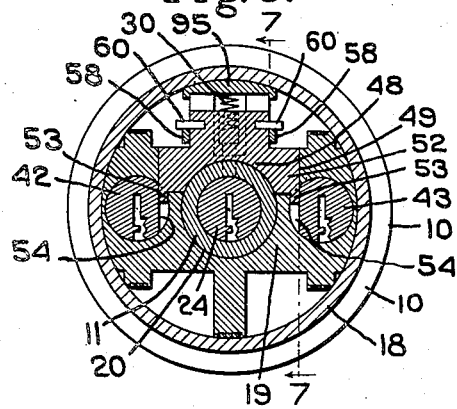
Fig. 6 is a section on the line 6—6, Fig. 1.
Figure 7:
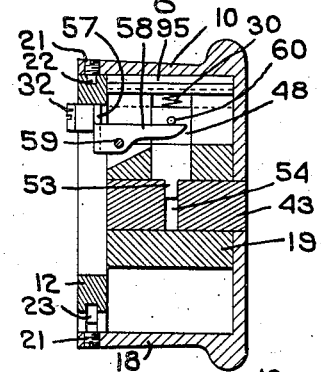
Fig. 7 is a section on the line 7—7, Fig. 6.

For this purpose the pin-lifting pin member 48 is provided on each side with a wing or extension 52 having at its lower end a lifting toe 53, and each key plug 42 or 43 is provided in its inner side with a groove 54 in which the corresponding toe 53 is normally received, as shown in Figs. 6 and 7.

Figure 8:
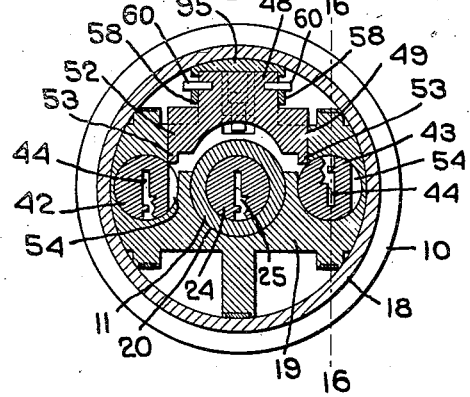
Fig. 8 is also a section on the line 6—6, Fig. 1, but showing the lock released through the operation of one of the master keys.

If the key plug, as shown in Fig. 6, is given a clockwise turning movement the flat face 55 forming the bottom of the groove 54 has a camming action against the toe 53 which will raise the pin-lifting block 48 into the position shown in Fig. 8, and when the key plug 43 has been given a half rotation, as shown in Fig. 8, the toe 53 will rest against the periphery of the plug and the pin-lifting block will thereby be held in its raised position.

As stated above the raising of the pin-lifting block withdraws the pin sections 28 from the wall 11 of the stationary knob-supporting member, thereby unlocking the knob 10 so that the knob is free to be turned to withdraw the bolt 2.

If it is desired to lock the door again after it has been opened then the key plug 43 is returned to its normal position shown in Fig. 6 to bring the groove 54 into register with the toe 53, thereby allowing the pin-lifting member 48 to move downwardly into the position shown in Fig. 6, and as this occurs the springs 30 will force the pin sections 28 into locking engagement with the wall 11. The springs 30 are backed by a plate 95 secured to the body 19 by screws 96.

A rotation of the key plug 42 in a counter-clockwise direction will similarly raise the pin-lifting block 48 and release the knob 10, and thus it will be seen that the knob 10 can be unlocked by turning either of the key plugs 42 or 43, it being necessary to turn one of the plugs (the plug 43) in a clockwise direction and the other plug (the plug 42) in a counter-clockwise direction.

If it is desired to unlock the knob 10 by the use of either master key and then to leave the door unlocked after withdrawing the key, then the key plug (42 or 43) is given a half rotation, as shown by the key plug 43 in Fig. 8, and the key is then withdrawn. This will leave the key plug in the position shown by the key plug 43 in Fig. 8 and said key plug will hold the pin-lifting member 48 raised so that the knob 10 will remain unlocked until the key is again inserted in the key plug and the latter returned to its normal position shown in Fig. 8.

To provide for thus withdrawing the master key with the key plug in the position shown by the key plug 43 in Fig. 8 the body 19 of the knob 10 is provided with a duplicate set of spring-pressed follower pins 56 (see Fig. 16) situated opposite to the pins 45 so that when the plug 43 or 42 has been given a half rotation the setting pin sections 46 are in line with the duplicate follower pin sections 56, thus permitting the key to be withdrawn. These duplicate follower sections 56 serve also to lock the plug from rotation until the key is again inserted therein to line up the tumbler pins. Each of the key plugs 42, 43 also has two key-receiving positions. One of these positions is that shown in Fig. 6, and the other of these positions is that shown in Fig. 8 with respect to the plug 43. The proper key can be inserted into or withdrawn from either key plug 42 or 43 when it is in either one of these two key-receiving positions.

From the above it will be understood that the lock herein shown is one in which the knob 10 can be unlocked either by simply inserting a key 31 in the key slot of the plug 24, or by rotating the key plug 42 in a counter-clockwise direction by means of its master key or by rotating the plug 43 by its master key in a clockwise direction. Since the master key combinations are entirely separate from the combinations of the regular key 31 it follows that it is possible to make a lock embodying my invention with a master key which will control a much larger number of combinations than a master key which is used in the same key plug as the regular key.

My improved lock is also constructed so that the door can always be opened by turning the inside knob 9, the construction being such that the initial turning of the knob 9 in either direction serves to raise or retract the pin-lifting member 48 thereby to unlock the knob 10, and further rotative movement of the inside knob turns the spindle to withdraw the bolt 2, the knob 10 turning with the spindle.

A stationary escutcheon member 64 is attached to the door on the inside thereof and is situated between the inner knob 9 and the door, the construction of which escutcheon member being presently described. The knob 9 has a plate 66 secured to its inner face by means of screws 67, and this plate is provided with a hub 68 having a square opening therein to fit the square shape of the spindle 6 so that rotation of the knob will turn the spindle. The knob 9 is retained on the spindle through the medium of a cup-shaped member 69 which is rotatably mounted within the knob 9 and is provided with interior screw threads 70 adapted to engage screw threads 71 formed on the corners of the spindle 6. This cup-shaped member 69 has an extension 72 which is exposed at the face 73 of the knob 9 and comes flush with said face, said extension having a screw-driver slot 74 therein. This cup-shaped member 69 is thus retained in position between the plate 66 and the shoulder 75 on the interior of the knob 9, but it may be rotated within the knob by inserting a screw-driver or other implement in the slot 74. The member 69 functions as a nut which has screw-threaded engagement with the spindle 6, and by turning the cup-shaped member 69 within the knob said member will be screw-threaded to the spindle, thereby securing the knob 9 thereto. Since the opening in the hub 68 of the plate 66 fits the square shape of the spindle the knob cannot rotate on the spindle but simply moves lengthwise of the spindle as the cup-shaped member 69 is turned. In order to avoid the unsightly appearance which the screw-driver slot 74 would give if it were exposed I propose to employ a filler 76 for said screw-driver slot, said filler normally occupying the slot and being held in its operative position by means of a spring 77 which encircles the cup-shaped member 69 and is confined between the plate 66 and arms 78 extending from the rear end of the filler 76. Normally the spring presses the arm 78 against the shoulders 75, thereby keeping the outer end of the filler flush with the face of the knob, in which position the filler completely fills the screw-driver slot 74. When it is desired to remove the knob or adjust it on the spindle a screw-driver 79, shown in dotted lines, Fig. 11, may be pressed against the filler forcing it inwardly against the action of the spring 77, thereby allowing the screw-driver to enter the slot 74. When the proper adjustment has been made and the screw-driver has been removed the spring 77 will restore the filler to its normal position filling the screw-driver slot 74.

It will be remembered that the spindle 6 has fast thereto the disk 35 provided with an opening 34 in which is received the projection 32 carried by the body 19 of the knob 10. This projection 32 is formed on a yoke member 57, the legs 58 of which straddle the pin-lifting block 48, as shown in Figs. 5 to 8, said yoke being pivotally mounted at 59 on the body 19. The two legs 58 of the yoke are situated beneath and engage pins or projections 60 extending laterally from the pin-lifting member 48 so that a turning of the yoke about its pivot 59 in a counter-clockwise direction, Fig. 7, will raise the pin-lifting member 48.

The opening 34 in the disk 35 (see Fig. 4) is shaped to present a cam surface 61 on each side thereof. When the inner knob 9 is given its initial turning movement in either direction the resulting initial turning movement of the spindle 6 and disk 35 will cause one or the other cam surface 61 to engage the projection 32, thereby swinging the yoke 57 about its pivot 59 into the position shown in Fig. 16 and raising the pin-lifting block 48 as above-described. This unlocks the knob 10 and the inner knob 9 may then be turned sufficiently further to withdraw the bolt 2.

Enclosed within the escutcheon member 64 is a centering spring 63 by which the inner knob 9 is returned to its normal position after it has been turned in either direction for opening the door. This spring is located in an annular recess 65 with which the escutcheon member 64 is provided, the two ends of the spring normally resting against the end walls 80 of said recess. Mounted on the spindle 6 for turning movement therewith is a disk 81, said disk having a square opening therein fitting the square shape of the spindle. This disk is provided with an arm 82 which is situated between the two ends of the spring 63. When the knob is turned in either direction the arm bears against one end of the spring 63 and compresses the latter, the other end of said spring being retained against the shoulder 80 at one end of the recess 65. As soon as the knob is released, however, the spring 63 expands and returns the knob and spindle to their normal position.

The escutcheon member 64 is removably secured to the plate 16. For this purpose said plate is provided with a rib 83 which sets in a groove in a plate 84 that is secured to the inner side of the escutcheon member 64 by screws 85. This rib has an extension 86 which fits into a notch or groove 187 formed in the escutcheon member 64, and a screw 87 extends through the escutcheon member and plate 84 and screw threads into the plate 16, as shown in Fig. 13. Said screw 87 and the toe or projection 86 serve to rigidly connect the escutcheon member 64 to the plate 16 and thus to the door. The disk 81, however, is free to rotate within the escutcheon member as above described.

Figure 4:
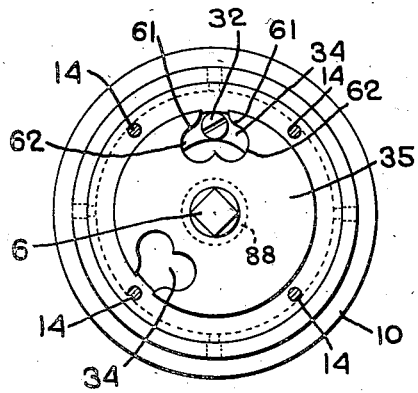
Fig. 4 is a view on the line 5—5, Fig. 1 showing the spindle and disk 35 in elevation.
Figure 5:
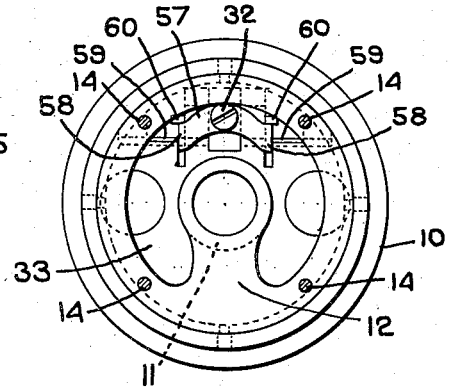
Fig. 5 is also a view on the line 5—5, Fig. 1 showing the spindle and disk 35 removed.

Sometimes locks for doors are made with the square hole through the hub 8 of the roll-back 5 with the flat sides extending at the 45° angle, as shown in Fig. 3, and sometimes they are made with the flat sides extending horizontally and vertically. In applying a knob and lock embodying my invention to a door which has the bolt 2 and roll-back therein it is desirable that the outer knob should be positioned that the three key plugs therein will occupy a horizontal position, and in order to adapt my lock for a door wherein the flat sides in the hub of the roll-back are in the horizontal and vertical position as well as to a roll-back in which the flat sides are in the 45° position, I have provided a construction whereby the relative annular positions of the spindle 6 and the knob 10 may be changed to suit either type of roll-back. For this purpose the disk 35 which is attached to the end of the spindle is provided with two similar openings 34 situated 135° apart, as shown in Fig. 4, and said disk is also formed with a hub portion 88 which is received in the inner end of the plug-receiving bore of the stationary knob-supporting member 11, 12. The disk 35 is yieldingly held against the knob 10 by means of a spring 89 that is situated in a recess 90 formed in the escutcheon member 13 and which acts against a disk 91 that in turn rests against the disk 35.

When the parts of the lock are assembled with the projection 32 occupying one of the openings 34 in the disk 35 the spindle will be so positioned relative to the knob 10 that when the knob is situated with the three plugs horizontal the flat faces of the spindle will have the position shown in Fig. 3.

On the other hand, if the parts are assembled so that the projection 32 occupies the other aperture 34, then the spindle 6 will have such relation to the knob 10 that when the knob is positioned with the three plugs in horizontal alignment the flat faces of the spindle will have horizontal and vertical positions.

In Figs. 20, 21 and 22 I have shown a modification of the invention wherein the key plugs for the master keys are omitted.

In said figures a portion of the spindle and the outer knob only are shown. The spindle is indicated at 6 and it and the inner knob 9 and the bolt 2 may have the same construction as illustrated in Fig. 1.

In the construction shown in Figs. 20, 21 the outer knob is indicated at 100 and it is rotatably mounted on the stationary knob-supporting member 11, 12 having the same construction as that illustrated in Figs. 1 to 19, said stationary knob-supporting member being secured to the outer escutcheon member 101 which in turn is fastened to the door.

Situated within the cylindrical portion 11 of the knob-supporting member is a key plug 102 having the key slot 103.

The outer knob is normally locked to the cylindrical wall 11 by means of the pins 104, each pin having the setting section 105 located within the key plug 102, the locking section 106 situated within the body of the knob and acted on by the spring 107 and an intermediate section 108 which has a length equal to the thickness of the wall 11, these pins being so constructed that when the proper key is inserted in the key slot the pins are lined up so that the line of division between the setting sections and the intermediate section 108 is in alignment with the outer periphery of the key plug, and the line of division between the intermediate section 108 and the locking section 106 is in alignment with the outer periphery of the cylindrical portion 11, whereby the knob 100 is unlocked.

Said knob 100 has a projection 109 extending therefrom and into a semi-circular slot 110 formed in a disk 111 fastened to the end of the spindle 6, said disk 111 occupying a recess formed in the escutcheon member 101. Normally the projection 109 has a position at the end of the slot 110, as shown in Fig. 22.

When the proper key is inserted in the key slot 103 the pins 104 are lined up and the knob 109 is then free to be turned. By turning the knob in a clockwise direction, Fig. 22, the projection 109 will actuate the disk 111 and thereby turn the spindle 6 to withdraw the bolt 2.

The spindle 6 can be turned, however, in a clockwise direction, Fig. 22, even when the outer knob is locked because of the presence of the slot 110, and, therefore, a person on the inside of the room can always open the door by turning the knob 9 in a direction to turn the spindle in a clockwise direction, Fig. 22, regardless of whether the outer knob is locked or unlocked.

I claim:

1. A door lock comprising a stationary knob-supporting member adapted to be secured to a door, a knob rotatably mounted on said knob-supporting member, a lock for locking said knob to said knob-supporting member and comprising a key plug carried by the knob-supporting member and having a key slot, sectional tumbler pins in said knob and key plug which are lined up by the insertion of the key in the key slot, thereby releasing the knob, and a bolt connected to the knob to be actuated thereby independently of the key plug.

2. A door lock comprising a stationary knob-supporting member having a hollow cylindrical portion, a knob rotatably mounted on said cylindrical portion, a key plug mounted within said cylindrical portion and having a key slot, sectional tumbler pins in the knob and key plug, which pins are lined up by the insertion of the key in the key slot, thereby unlocking the knob from the knob-supporting member, a bolt, and means to withdraw the bolt by turning movement of the knob.

3. A door lock comprising a stationary knob-supporting member, means for securing the latter to the door, a knob rotatably mounted on said knob-supporting member, a series of spring-pressed locking pins carried by the knob and normally having interlocking engagement with the knob-supporting member, a key plug rotatably mounted in the knob-supporting member and having a key slot, and means for releasing the locking pins from the knob-supporting member by the insertion of a key in the key slot.

4. A lock comprising a stationary knob-supporting member, means for securing the same to a door, a knob rotatably mounted on said knob-supporting member, a key plug rotatably mounted in the knob-supporting member and having a key slot, locking pins normally locking both the knob and the key plug to the knob-supporting member, which pins are lined up to unlock both the knob and the key plug by the insertion of a key in the key slot.

5. A lock comprising a stationary knob-supporting member, means for securing the same to a door, and key plug carried by the knob-supporting member and having a key slot, a knob mounted on the knob-supporting member for turning movement independently of the key plug, locking pins normally locking both the knob and the key plug to the knob-supporting member, which pins are lined up to unlock both the knob and the key plug by the insertion of a key in the key slot, a bolt for the door, a spindle for withdrawing the bolt, and means to turn the spindle by turning movement of the knob.

6. A door lock comprising a knob-supporting member, means for securing the same to the outer side of the door, an outer knob rotatably mounted on the knob-supporting member, a locking pin normally locking the knob to the knob-supporting member, a key plug rotatably carried by the knob, and means to withdraw the locking pin from the knob-supporting member by rotation of said key plug.

7. A door lock comprising a knob-supporting member, means for securing the same to the outer side of the door, an outer knob rotatably mounted on the knob-supporting member, locking pins normally locking the knob to the knob-supporting member, a plurality of separate key plugs rotatively carried by the knob and capable of being independently operated, and means actuated by the rotation of any one of the key plugs to withdraw the locking pins from the knob-supporting member.

8. A door lock comprising a stationary knob-supporting member, means securing the latter to the door, a knob rotatably mounted on said knob-supporting member, a plurality of locking pins carried by the knob and normally locking the same to the knob-supporting member, a pin-lifting block for withdrawing the pins from the knob-supporting member, a key plug rotatably carried by the knob, and means to raise the pin-lifting block by rotation of the key plug, thereby to release the knob for turning movement.

9. A door lock comprising a stationary knob-supporting member, means securing the latter to the door, a knob rotatably mounted on said knob-supporting member, a plurality of locking pins carried by the knob and normally locking the same to the knob-supporting member, a pin-lifting block for withdrawing the pins from the knob-supporting member, a plurality of key plugs carried by the knob, and means to raise the pin-lifting block by rotation of any key plug, thereby to release the knob for turning movement.

10. A door lock comprising a knob-carrying member stationarily secured to the outer side of the door, an outer knob rotatably mounted thereon, locking pins for locking said knob to the knob-supporting member, a pin-lifting block for releasing the pins from the knob-supporting member, a key plug rotatably carried by the knob, means to raise the pin-lifting block by rotation of the key plug, a bolt-actuating spindle extending through the door, an inner knob carried by said spindle on the inside of the door, means to turn the spindle by turning movement of the outer knob after the latter has been unlocked, and means for raising the pin-lifting block by initial turning movement of the inner knob.

11. A door lock comprising a stationary knob-supporting member adapted to be secured to a door, a knob rotatively mounted on said knob-supporting member, and lock for locking said knob to said knob-supporting member and comprising a key plug rotatively carried by the knob-supporting member and having a key slot, said plug being turnable into either one of two key-receiving positions, sectional tumbler pins in said knob and key plug which are lined up by the insertion of a key in the key slot when the plug is in one key-receiving position, whereby the knob is released, a bolt connected to the knob to be actuated thereby independently of the key plug, and means to hold the tumbler pins out of operation when the key plug is in its other key-receiving position.

12. A door lock comprising a stationary knob-supporting member, means for securing the latter to a door, a knob rotatively mounted on said knob-supporting member, a series of spring-pressed locking pins carried by the knob and normally having interlocking engagement with the knob-supporting member, a key plug rotatively mounted in the knob-supporting member and having a key slot, said key plug being capable of being turned independently of the knob into either one of two key receiving positions, means for releasing the locking pins from the knob-supporting member by the insertion of a key in the key slot when the plug is in one key-receiving position, and means operative when the key plug is in the other receiving position to hold the locking pins released.

13. A door lock comprising a knob-supporting member, means for securing the same to the outer side of a door, an outer knob rotatively mounted on the knob-supporting member, locking pins normally locking the knob to the knob-supporting member, a key plug rotatably carried by the knob and turnable into either one of two key-receiving positions, means to withdraw the locking-pins from the knob-supporting member by rotation of said key plug from one key-receiving position to the other, and means to maintain said pins so withdrawn so long as the key plug remains in said other key-receiving position.

14. A door lock comprising a knob-supporting member, means for securing the same to a door, a knob rotatably mounted on the knob-supporting member, locking pins normally locking the knob to the knob-supporting member, a plurality of separate key plugs rotatably carried by the knob and capable of being independently operated, each key plug being turnable into either one of two key-receiving positions, means actuated by the rotation of any one of the key plugs from one key-receiving position into the other key-receiving position to withdraw the locking pins from the knob-supporting member, and means to maintain said pins so withdrawn until the key plug has been returned to the first named key-receiving position.

15. A door lock comprising a knob-supporting member, means for securing the same to the outer side of the door, a knob rotatably mounted on the knob-supporting member, locking pins normally locking the knob to the knob-supporting member, a plurality of separate key plugs rotatably carried by the knob and capable of being independently operated, means actuated by the rotation of any one of the key plugs to withdraw the locking pins from the knob-supporting member, a bolt-actuated spindle extending through the door and having a portion square in cross section, a roll back on the square portion of the spindle, and means for connecting the knob to the spindle when the latter is normally in either a position with the sides of the square portion extending horizontally and vertically or in a position with the sides of the square portion at 45 degrees to the vertical.

JOSEPH H. MILLIGAN.